March 15, 1966 G. O. RANES 3,240,075
DRAG CUP DAMPER MEANS FOR GYROSCOPES
Filed June 29, 1962 4 Sheets-Sheet 1

INVENTOR.
GEORGE O. RANES
BY
Herbert L. Davis
ATTORNEY

INVENTOR.
GEORGE O. RANES
BY Herbert L. Davis
ATTORNEY

United States Patent Office 3,240,075
Patented Mar. 15, 1966

3,240,075
DRAG CUP DAMPER MEANS FOR GYROSCOPES
George O. Ranes, Bergenfield, N.J., assignor to The Bendix Corporation, Teterboro, N.J., a corporation of Delaware
Filed June 29, 1962, Ser. No. 206,375
6 Claims. (Cl. 74—5.5)

This invention relates to an improved multi-pole magnet for damping a drag cup of an angular rate gyroscope and method of fabricating such a damper magnet and more particularly to a novel arrangement of a drag cup and multi-pole magnet in an angular rate gyroscope of the type shown in U.S. Patent No. 3,009,360, granted November 21, 1961, to Alex Morsewich, and assigned to The Bendix Corporation. Further the invention relates to a novel method of fabricating the multiple pole damper magnet by mounting a series of permanent magnets about a hub member of ferro-magnetic material.

An object of the invention is to fabricate a multiple pole damper magnet by copper plating and tinning the inner end surfaces of a plurality of members of high energy magnetic material to be permanently magnetized and sweating the same together on a hub of a ferro-magnetic material having a relatively low resistance to a magnetizing force and in turn securing the same in a fixture ring so that the assembly may be bonded together by using an epoxy resin, solder or other nonmagnetic filler for filling in the spaces between the several poles.

Another object of the invention is to so fabricate a multi-pole damper magnet as to obtain a high magnetic flux density substantially greater than that heretofore obtained by a single permanent magnet and an arrangement of a plurality of permanent magnets so oriented as to take advantage of the high energy characteristics of the material utilized in the permanent magnets while providing a material of a very low resistance to the magnetizing force for providing return paths for the magnetizing force of the several permanent magnets.

Another object of the invention is to provide an improved multi-pole magnetic damping arrangement of maximum energy characteristics to cooperate with a drap cup in a gyroscope of limited size so as to effect a torque in opposition to that of the gyroscope gimbal to dampen oscillations of the gyroscope gimbal.

Another object of the invention is to provide a novel method of fabricating a multi-polar magnet so as to realize or obtain the maximum energy characteristics of the oriented magnetic materials therein.

Another object of the invention is to provide a novel method of assembling a multi-polar magnet by so assembling permanent magnets of high energy magnetic material in relation to materials of relatively low resistance to the magnetizing force thereof so as to realize the virtues of the high energy magnetic material without the disadvantages of the high resistance of such materials to magnetizing forces acting in opposition to the orientation thereof.

In certain high energy magnetic material such as Alnico V and VI, platinum cobalt material and an aluminum cobalt material, it has been found that unless such material is oriented in the direction in which the desired magnetic flux is to flow, such materials have a very high resistance to the flux flow while on the other hand ferromagnetic materials such as soft iron may provide a very low resistance to the flow of the magnetic flux.

Another object of the invention, therefore, is to so orient the materials of high energy characteristics as to produce a maximum magnetic field while the soft iron material of low resistance to the magnetic forces may provide a hub around which the members of high energy characteristics are arranged and a return path for the flow of magnetic flux to effect a magnetic system of maximum magnetic flux density.

Moreover, as is well known in the art, the damping characteristics effected by the multi-polar damper magnet varies directly as the length and the square of the flux density and moreover by equally spacing the magnet poles about the core and increasing the number of poles within practical limits, the damping characteristics of the magnet may be substantially increased.

Therefore, an object of the invention is to so fabricate the multi-polar magnet as to effect such maximum damping characteristics.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings

Figure 1:
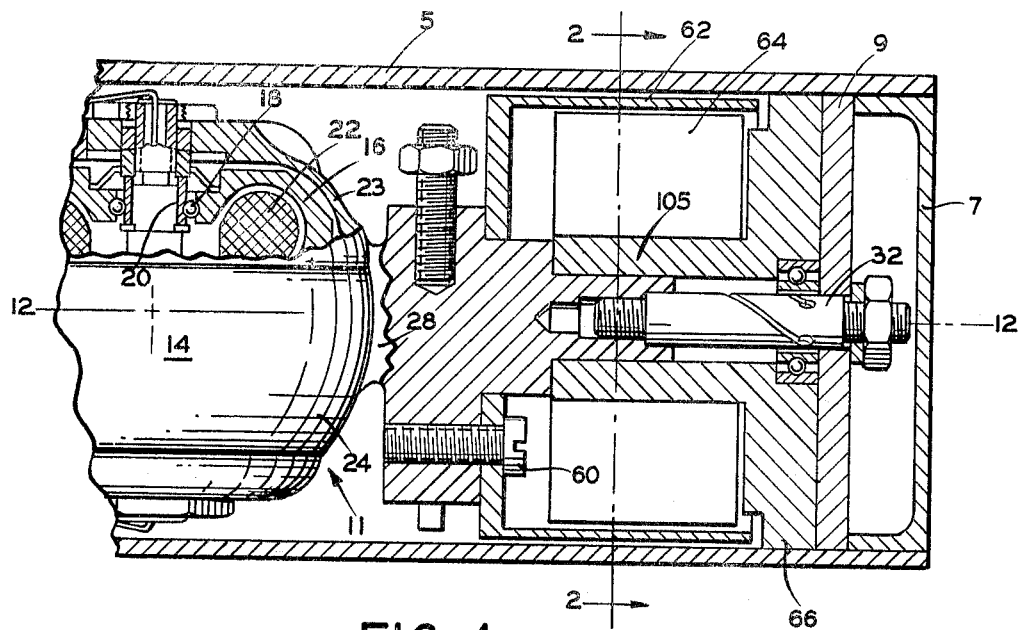
FIGURE 1 is a fragmentary sectional view of a rate gyroscope assembly illustrating a novel multi-polar damper magnet in cooperative relation with a drag cup in an angular rate gyroscope such as disclosed in the aforenoted Morsewich U.S. Patent No. 3,009,360.

Referring to the drawing of FIGURE 1, there is illustrated a fragmentary sectional view of a device embodying the present invention and which may be an angular rate gyroscope such as shown in greater detail in U.S. Patent No. 3.009,360, granted February 21, 1961, to Alex Morsewich and assigned to The Bendix Corporation.

The gyroscope may include a casing 5 of a ferro-magnetic material having a generally cylindrical form and attached to one end a cap 7. Mounted within the casing 5 and positioned at opposite ends thereof are suitable end plates, one of which is indicated in FIGURE 1 by the numeral 9 of a nonmagnetic material and so arranged as to support the output shafts of a gyroscope indicated generally by the numeral 11 and angularly movable about the precession axis 12—12 of the gyro as shown in greater detail in the aforenoted U.S. Patent No. 3,009,360.

The rotor casing or gimbal 14 of the gyro 11 is disposed in a central portion of the casing 5 and has rotatably mounted therein a gyro rotor 16 carried by several bearings 18 mounted on a shaft 20 and driven by a suitable motor 22 supported within the rotor casing or gimbal 14. The rotor shaft 20 is supported at opposite ends by split upper and lower sections 23 and 24 of the gimbal 14, as explained in the aforenoted patent.

Output shafts are disposed at opposite ends of the gimbal 14, one of which is indicated by the numeral 28. These shafts are in turn supported at the opposite ends thereof by slotted torsion bars, one of which is indicated by the numeral 32, and the operation of which is explained in the aforenoted patent.

Further, there is secured to the output shaft 28 by a screw 60 a drag cup 62 of a suitable low electrical resistance nonmagnetic material such as copper, silver or gold. The drag cup 62 protrudes into a magnetic flux gap produced by a novel damper magnet 64 carried by an end plate 66 of a nonmagnetic material and cooperating with the drag cup 62 so as to dampen oscillations of the gimbal assembly 14. The end plate 66 is suitably affixed in the casing 5.

Figure 2:
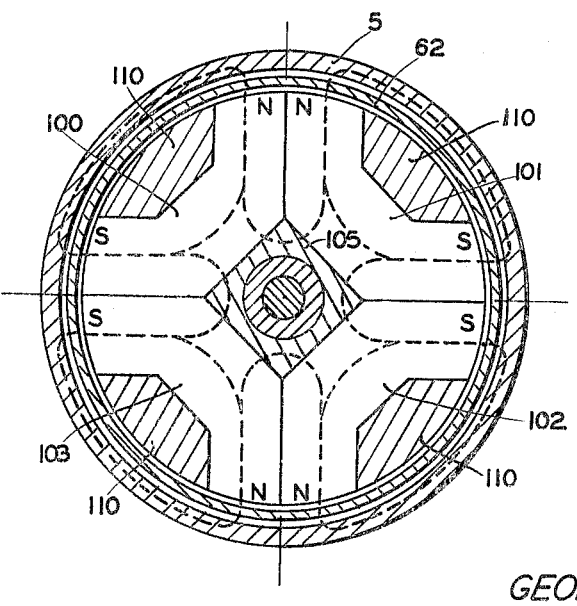
FIGURE 2 is a sectional view of one form of the invention illustrating a four pole damper magnet for the drag cup of the gyroscope taken along the lines 2—2 of FIGURE 1 and looking in the direction of the arrows.

The damper magnet indicated generally by the numeral 64 and embodying the present invention may be of the form illustrated in greater detail in FIGURE 2 and composed of substantially U-shaped permanent magnetic elements 100–101 and 102–103 having leg portions which are assembled respectively in abutting back-to-back relation about a substantially square core shaped member 105 of a ferro-magnetic material having a low resistance to the flow of magnetic flux.

The magnetic members 100–101 and 102–103 are formed of a high energy magnetic material such as Alnico V or VI, platinum cobalt, or an aluminum cobalt material. While the square core shaped member 105 is formed of a soft iron or ferro-magnetic material having a very low resistance to the flow of the magnetic flux under the magnetizing forces.

In the aforenoted arrangement, the respective U-shaped magnetic members 100–101 and 102–103 are arranged with their respective north and south poles positioned in adjacent relation, as shown in FIGURE 2, so that the magnetic lines of force created thereby, as indicated by the dotted lines, pass through the drag cup 62 of the aforenoted material and casing 5 of the gyroscope which may be formed by suitable ferro-magnetic material to return to the opposite pole of the assembled U-shaped permanent magnets 100, 101, 102, and 103 as the case may be.

In the aforenoted arrangement, the several magnetic members in the core 105 may be copper plated on the inner surfaces and sweated together by solder in a furnace at an approximate temperature of, for example, 700 to 800 degrees Fahrenheit, and further bonded together by the insertion of a solder, epoxy resin or other suitable filler 110 of a nonmagnetic material in the spaces between the legs of the U-shaped members 100, 101, 102, and 103.

While the form of invention illustrated in FIGURE 2 has been found to provide a damper magnet of increased flux density such arrangement does not realize or obtain the maximum characteristics of the oriented magnetic materials in that it has been found that the damping characteristics effected by the multi-polar damper magnet varies directly as the length and the square of the flux density. However, it has been further found that by equally spacing the poles about the core and increasing the number of the so equally spaced poles of the damper magnet, the damping characteristics thereof may be substantially increased. In order to increase the damping characteristics of a damper magnet such as embodied in gyroscopes of extremely small size, the second form of the invention illustrated in FIGURE 3 was devised in which the number of the equally spaced poles have been increased from the four poles illustrated in FIGURE 2 to the equally spaced eight poles shown in the form of the invention of FIGURE 3.

Figure 3:
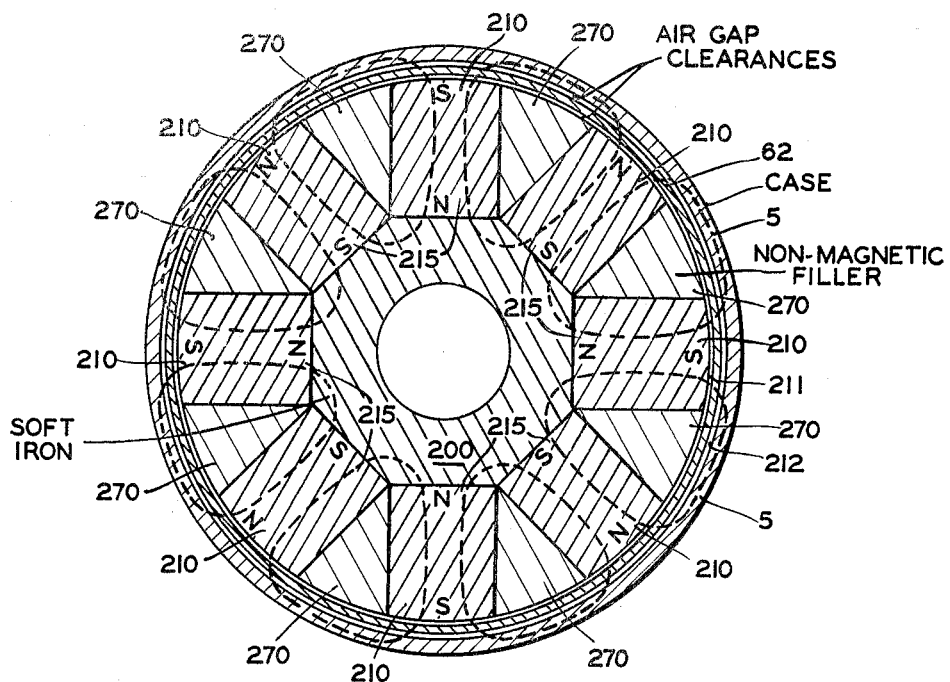
FIGURE 3 is a sectional view of a second form of a multi-polar damper magnet taken along lines corresponding to 2—2 of FIGURE 1.
Figure 4:
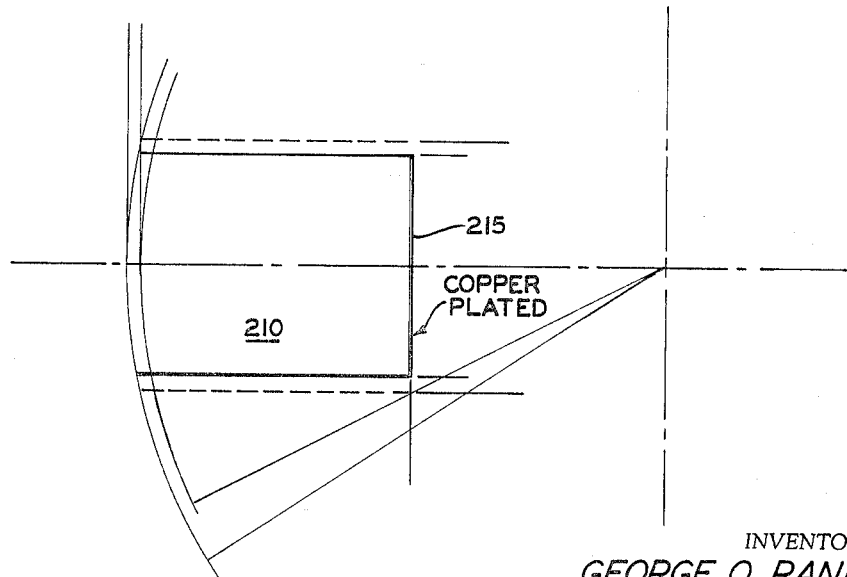
FIGURE 4 is a side view of one of the permanent magnet members of the multi-polar damper magnet illustrated in FIGURE 3.

However, in order to fabricate the multi-polar arrangement, illustrated in FIGURE 3 so as to realize or obtain the maximum energy characteristics of the oriented magnetic materials, there has been provided an octagonal magnetic core indicated by the numeral 200 of a suitable soft iron or ferro-magnetic material having a very low resistance to the flow of the magnetic flux generated by the permanent magnets 210 positioned about the core 200 and projecting therefrom.

As distinguished from the material of the core 200, the permanent magnet members 210 are formed of a material having a maximum energy characteristic such as Alnico V or VI, a platinum cobalt material, or an aluminum cobalt material, and which material unless oriented in the direction in which the magnetic flux is to flow has a very high resistance to the flow of the magnetic flux compared to that of the soft iron or ferro-magnetic material of the core 200.

However, when the permanent magnet material is oriented in the proper direction, there may be produced a maximum magnetic field and the magnetic flux generated by the permanent magnets 210 flows in a return path adjacent the inner ends thereof through the soft iron or ferro-magnetic material of the core 200 while at the outer ends of the adjacent members 210, the magnetic flux flows through the low electrical resistance nonmagnetic material of drag cup 62 and through the ferro-magnetic material of the casing 5 as the other return path, as shown schematically by the dotted lines in the drawing of FIGURE 3.

In the aforenoted arrangement, there may be an air gap 211 of, for example, .005 of an inch between the ends of the permanent magnets 210 and the drag cup 62 which in turn may have a thickness of, for example, .020 of an inch while there may be a further air gap 212 of, for example, .004 of an inch between the drag cup 62 and the casing 5 of the gyroscope.

There is thus provided a magnetic system so arranged as to effect the highest magnetic flux density for damping oscillations of the drag cup 62. The rate of such damping will depend, of course, on the rate of movement of the cup 62 of a low electrical resistance nonmagnetic material such as copper, silver or gold, in this very strong magnetic field.

Figure 5:
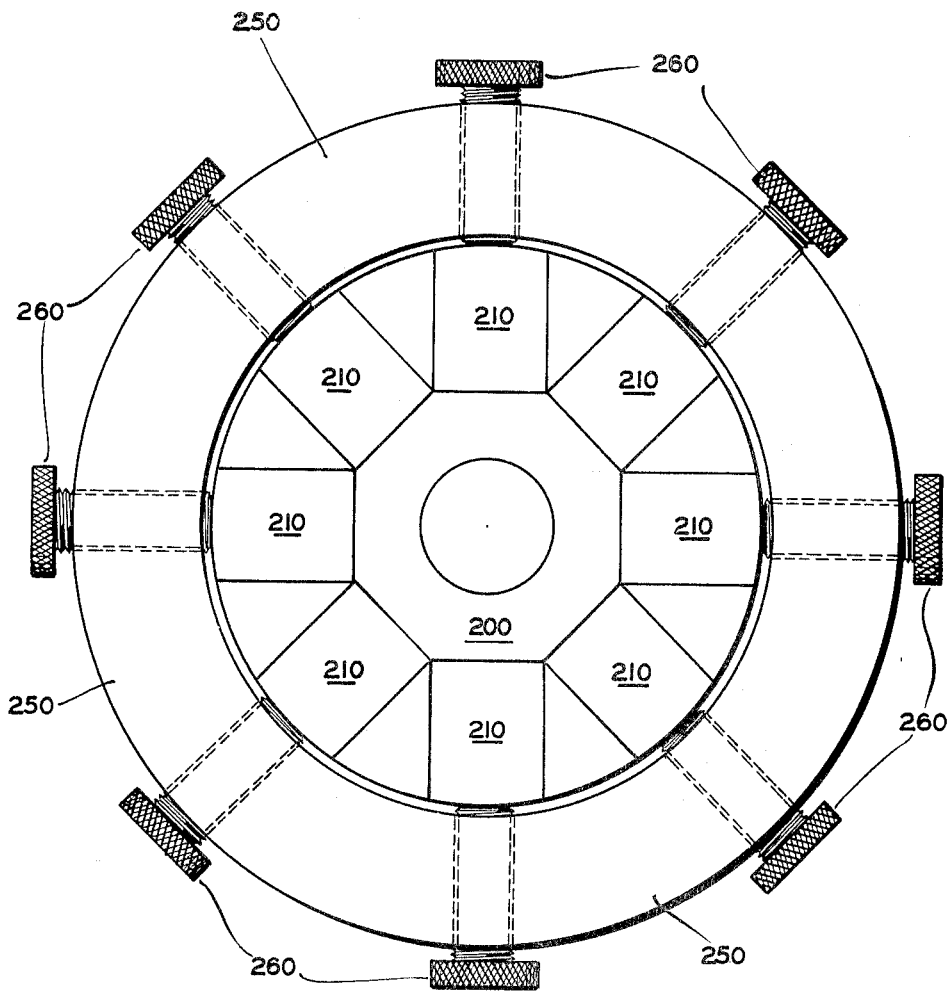
FIGURE 5 is an end view of a damper magnet assembly fixture for the multi-polar magnet of FIGURE 3.

In fabricating the improved damper magnet of FIGURE 3, the respective permanent magnet members 210 are copper plated at the inner ends 215 thereof and then tinned and sweated together on corresponding octagonal surfaces of the core member 200 in a fixture ring 250, shown in FIGURE 5, having screw threaded fastening bolts 260 for forcing the several permanent magnet members 210 into tight engagement with the respective octagonal surfaces of the core member 200. The entire assembly is then placed in a suitable furnace at a temperature of approximately 800 degrees Fahrenheit and the parts sweated together as shown in the assembly of FIGURES 3 and 5.

The assembly is further bonded together with the use of a solder, epoxy resin or other suitable nonmagnetic filler material 270 for filling the space between the several permanent magnet members 210, as best shown in FIGURE 3.

Figure 6:
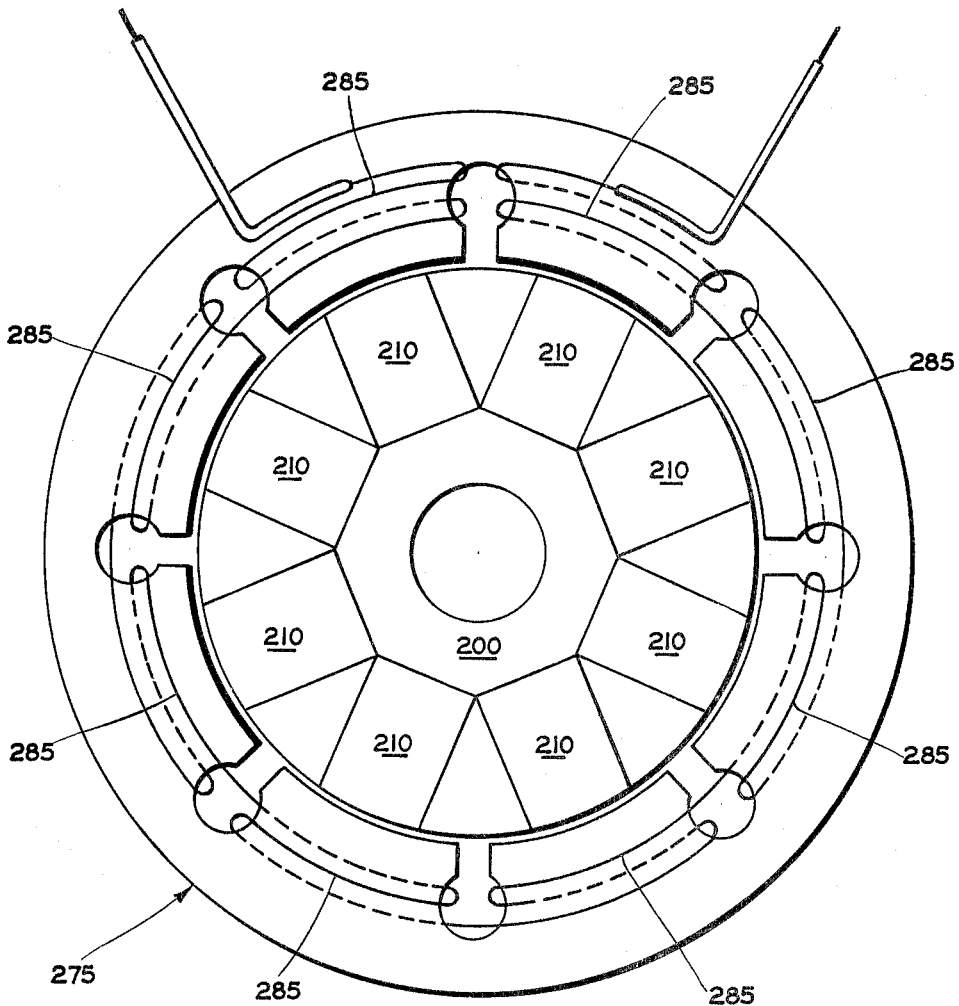
FIGURE 6 is an end view of a charger for magnetizing the permanent magnet members of the multi-polar damper magnets of FIGURE 3.

The assembled damper magnet may then be positioned in a suitable charger unit indicated generally by the numeral 275 and shown in FIGURE 6. The charger unit 275 may include suitable electromagnetic windings 285 which may be energized by a direct current and in a sense so as to permanently magnetize the respective members 210 in opposite directions, as indicated by the letters N and S in the assembly of FIGURES 3 and 6.

In the aforenoted arrangement, it is now seen that by the provision of the soft iron or ferro-magnetic core 200 and the arrangement of the several permanent magnets 210 in relation thereto, full advantage is taken of the high energy characteristics of the permanent magnets 210 while the very low resistance to the magnetized force of the soft iron or ferro-magnetic core 200 is utilized so as to obtain the highest magnetic flux density.

Although only two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. For use in a gyroscopic device of a type including a rotor case, a fixed frame, means including an output shaft for resiliently supporting the rotor case relative to the frame for angular movement about a precession axis of the rotor case, damping means having a drag cup operatively connected to said output shaft and a damper magnet cooperating therewith; the improvement in which said damper magnet includes a plurality of permanent magnets of a relatively high energy magnetic material, a hub member centrally rotatable within said fixed frame and wherein said hub member is of a material having a relatively low resistance to a magnetizing force, and said permanent magnets positioned about said hub member and projecting therefrom, and cooperating with said drag cup and being spaced about said hub member so as to effect a relatively high magnetic flux density for damping oscillations of the drag cup.

2. The combination defined by claim 1 in which said permanent magnets include substantially U-shaped members having leg portions mounted in back-to-back relation about the hub member and extending radially outward therefrom.

3. A device as defined by claim 1 in which said hub member is of an octagonal shape, and the permanent magnet members are affixed to corresponding surfaces of the octagonally shaped hub member and project radially and outwardly therefrom.

4. A method of fabricating a multi-pole damper magnet comprising the steps of providing a hub of a ferro-magnetic material having a relatively low resistance to a magnetizing force, providing a plurality of members of high energy magnetic material, filling the spaces between the members with a nonmagnetic filler, and subjecting each of the members to a magnetizing force so as to permanently magnetize the members in an arrangement so as to take advantage of the high energy characteristics of the material thereof while the low resistance to the magnetizing force of the hub member provide return passages for the flow of magnetic flux under the magnetic forces of the several permanent magnet members.

5. A method of fabricating a multi-pole damper magnet comprising the steps of providing a hub of a ferro-magnetic material having relatively low resistance to a magnetizing force, providing a plurality of substantially U-shaped members of high energy magnetic material, filling the spaces between the members with a nonmagnetic filler, and subjecting each of the members to a magnetizing force so as to permanently magnetize the members, and mounting the U-shaped members on the hub in back-to-back relation so as to take advantage of the high energy characteristics of the material thereof while the low resistance to the magnetizing force of the hub member provide return passages for the flow of magnetic flux under the magnetic forces of the several permanent magnet members.

6. A method of fabricating a multi-pole damper magnet comprising the steps of providing an octagonal hub of a ferro-magnetic material having a relatively low resistance to a magnetizing force, providing a plurality of members of high energy magnetic material, copper plating an end surface of each of said members, sweating said copper plated end surface of each of the members on corresponding octagonal surfaces of the hub in radially spaced relation and under a relatively high temperature, filling the spaces between the several members with a nonmagnetic filler, and subjecting each of the members to a magnetizing force so as to permanently magnetize the members in an arrangement so oriented as to render effective the high energy characteristics of the material of said permanent magnet members while the low resistance to the magnetizing force of the material of the hub provides a return passage for the flow of magnetic flux under the magnetic force of the several permanent magnet members.

References Cited by the Examiner

UNITED STATES PATENTS

| 2,837,923 | 6/1958 | Klarman | 74—5.5 |
| 3,009,360 | 11/1961 | Morsewich | 74—5 |

FOREIGN PATENTS

| 871,319 | 1/1942 | France. |

BROUGHTON G. DURHAM, *Primary Examiner.*